United States Patent [19]

Cheon

[11] Patent Number: 5,504,749
[45] Date of Patent: Apr. 2, 1996

[54] APPARATUS FOR READING OUT ADDRESS INFORMATION

[75] Inventor: Young-chang Cheon, Seoul, Rep. of Korea

[73] Assignee: Samsung Electronics Co., Ltd., Kyungki, Rep. of Korea

[21] Appl. No.: 334,389

[22] Filed: Nov. 3, 1994

[30] Foreign Application Priority Data

Jan. 18, 1994 [KR] Rep. of Korea .......................... 94-880

[51] Int. Cl.$^6$ ...................................... G06F 7/00
[52] U.S. Cl. ................. 370/94.1; 340/146.2; 364/715.11
[58] Field of Search .................................. 370/85.4, 85.5, 370/85.9, 85.1, 94.1, 100.1, 84, 48; 364/715.11, 715.1; 340/146.2; 395/900

[56] References Cited

U.S. PATENT DOCUMENTS 5,235,593  8/1993  Grow et al. ............................ 370/85.4

Primary Examiner—Douglas W. Olms
Assistant Examiner—Dang Ton
Attorney, Agent, or Firm—Leydig, Voit & Mayer

[57] ABSTRACT

An address information reading-out apparatus of an FDDI network system for transmitting a packet composed of a plurality of m-bit symbols includes an m-bit data bus, an n×m-bit data bus, a control signal generator for detecting start and control symbols among the plurality of symbols received via said m-bit data bus and generating control signals, an input latch for alternately latching the address symbols having an odd number and the address symbols having an even number among the plurality of symbols, in response to the control signal of the control signal generator, an output latch for latching a pair of address symbols from the input latch in response to the control signal of the control signal generator and outputting onto the n×m-bit data bus, and a content addressable memory for receiving the address symbol from the n×m-bit data bus in response to the control signal of the control signal generator, determining whether the input symbol matches predetermined address information, and if so, generating a reading-out signal. Therefore, address information can be read out by hardware, thereby reducing the load on the CPU of the system and improving the performance of the system.

5 Claims, 4 Drawing Sheets

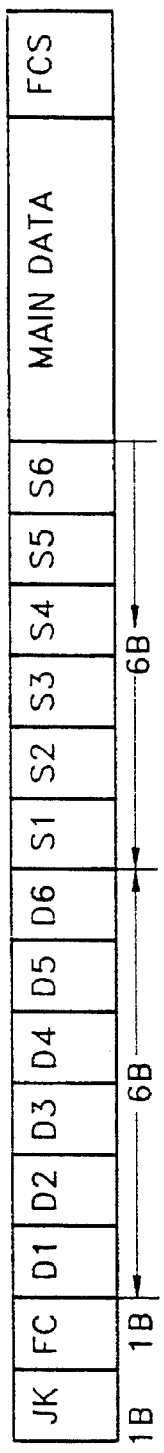
FIG. 4
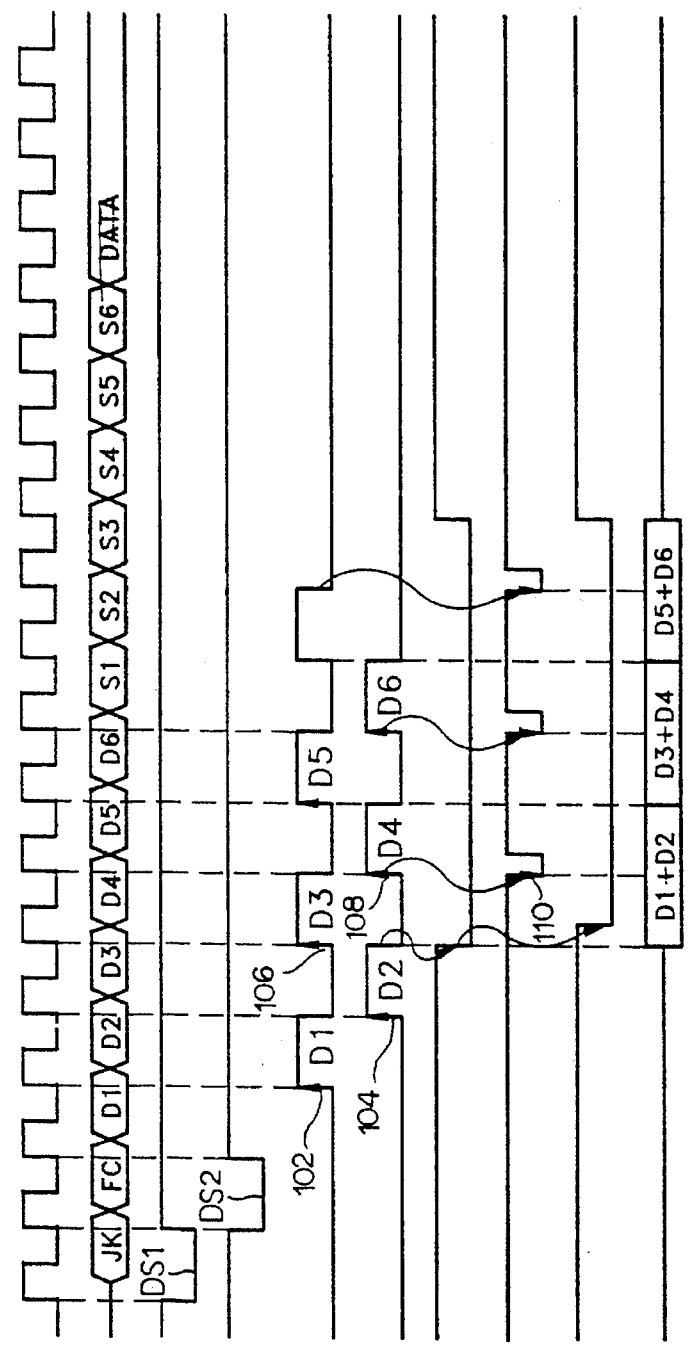
FIG. 5A
FIG. 5B
FIG. 5C
FIG. 5D
FIG. 5E
FIG. 5F
FIG. 5G
FIG. 5H
FIG. 5I
FIG. 5J

APPARATUS FOR READING OUT ADDRESS INFORMATION

BACKGROUND OF THE INVENTION

The present invention relates to an address information reading-out apparatus of a fiber-distributed data interface (FDDI) system, and more particularly, to an address information reading-out apparatus for automatically converting 8-bit data into 16-bit data.

Generally speaking, an FDDI system is a high speed local network standard succeeding Ethernet (IEEE802.3) and a token ring network (IEEE802.5), for corresponding to the need of a high speed data transmission and is standardized by a task group (X3T9.5) of the American National Standard Institute. The FDDI system is a high speed (100Mbps) network and is being put to practical use under the interest of businesses and computer manufacturers.

FIG. 1 is a diagram for illustrating the concept of a conventional FDDI network. An FDDI station 1, an FDDI station 2 and an FDDI station 3 are connected to an Ethernet A, an Ethernet B and an Ethernet C, respectively. FDDI station 1 transmits data to FDDI station 2, FDDI station 2 transmits data to FDDI station 3 and FDDI station 3 transmits data to FDDI station 1, thereby forming a network. Thus, if Ethernet A wants to transmit data to Ethernet B, FDDI station 1 receives data from Ethernet A and transmits it to FDDI station 2. Then, FDDI station 2 recognizes the destination address of the received data. If the destination address is "B," FDDI station 2 transmits the data to Ethernet B. As above, if the destination address of data is recorgnized to be in a corresponding Ethernet by a given FDDI station, the station transmits the data to the corresponding Ethernet. This process is called a forwarding operation. (Here, if the detected destination address is not in the corresponding Ethernet, the forwarding operation is not performed.)

As described above, while the data generated from each FDDI station circulates a closed transmission loop via the FDDI stations, each of the FDDI stations receives the data produced by itself. Here, if the packet is made by an FDDI station itself, the packet must be removed to prevent an endless circulation within the network. As above, when the packet transmitted from an FDDI station returns to the FDDI station itself, the packet is to be removed by the FDDI station. This process is called a stripping operation.

FIG. 2 is a block diagram of a conventional FDDI station system. The FDDI station system relates to a packet filtering and a stripping logic construction. A packet received from a physical layer 40 of the FDDI network transmission cable is input to an FDDI controller 30 as 8-bit data. FDDI controller 30 converts the 8-bit data of the received packet into 32-bit data and writes it in a memory 20. Here, FDDI controller 30 transmits a control signal for indicating the termination of the packet reception to a central processing unit (CPU) 10. In order to determine whether the received packet is to be forwarded to another network, the CPU 10 performs a forwarding program, constructs a database, and searches the destination address of the packet.

However, when network traffic increases in a system which combines the FDDI network (having a data transmission rate of 100Mbps) and some other kind of network, such as Ethernet, the forwarding rate is dropped due to the excessive load on the system's CPU. That is, when the forwarding of the received packet is determined according to a processing program, the packet transmission rate between the networks is lowered, thereby deteriorating the performance of the system.

SUMMARY OF THE INVENTION

To solve above described problems, it is an object of the present invention to provide an address information reading-out apparatus for converting 8-bit data of a packet to be received into 16-bit data, by realizing a packet forwarding by hardware, not software using a processing program.

To achieve above object, an address information reading-out apparatus of a FDDI network system for transmitting packet data having a plurality of m-bit symbols according to the present invention comprises: an m-bit data bus; an n×m-bit data bus; control signal generating means for detecting a part of start and control symbols among the plurality of m-bit symbols received via the m-bit data bus, and generating control signals; input latch means for alternately latching address symbols having an odd number and address symbols having an even number among the plurality of m-bit symbols, in response to control signals of the control signal generating means; output latch means for latching a pair of address symbols from the input latch means in response to control signals of the control signal generating means and outputting the latched pair of address symbols onto the n×m-bit data bus; and content addressable memory means for receiving the pair of address symbols from the n×m-bit data bus in response to control signals of the control signal generating means, determining whether the input symbols match predetermined address information, and if so, generating a reading-out signal. Thus, the address information can be read out by hardware.

The control signal generating means comprises a first detector for generating a first detection signal by detecting the start symbol of the start and control symbols, a second detector for generating a second detection signal by detecting the control symbol of the start and control symbols, state machine means for generating an odd number latch control signal, an even number latch control signal, an output latch enable control signal and state control signals, which are synchronized with a first clock signal, in response to the first and second detection signals, and memory control machine means for generating an enable control signal and a write control signal of the content addressable memory means, which are synchronized with a second clock signal, in response to the state control signals. The input latch means comprises first latch means connected to the m-bit data bus, for latching an odd number address symbol, in response to the odd number latch control signal, and the second latch means connected to the m-bit data bus, for latching an even number address symbol, in response to the even number latch control signal. The output latch means comprises third latch means connected to the first latch means and enabled by the output latch enable control signal, for latching the output of the first latch means in response to the odd number latch control signal, and fourth latch means connected to the second latch means and enabled by the output latch enable control signal, for latching the output of the second latch means in response to the even number latch control signal.

Therefore, an apparatus according to the present invention reads out address information among the received m-bit packet data using an n×m-bit content addressable memory and performs forwarding and stripping operations by hardware, thereby reducing the load to central processing unit of the system.

BRIEF DESCRIPTION OF THE DRAWINGS

The above objects and advantages of the present invention will become more apparent by describing in detail a preferred embodiment thereof with reference to the attached drawings in which:

FIG. 4 is a diagram of the data format of an FDDI packet; and

FIGS. 5A–5J illustrate an operation timing diagram of the address information reading-out apparatus of FIG. 3.

DETAILED DESCRIPTION OF THE INVENTION

Figure 1:
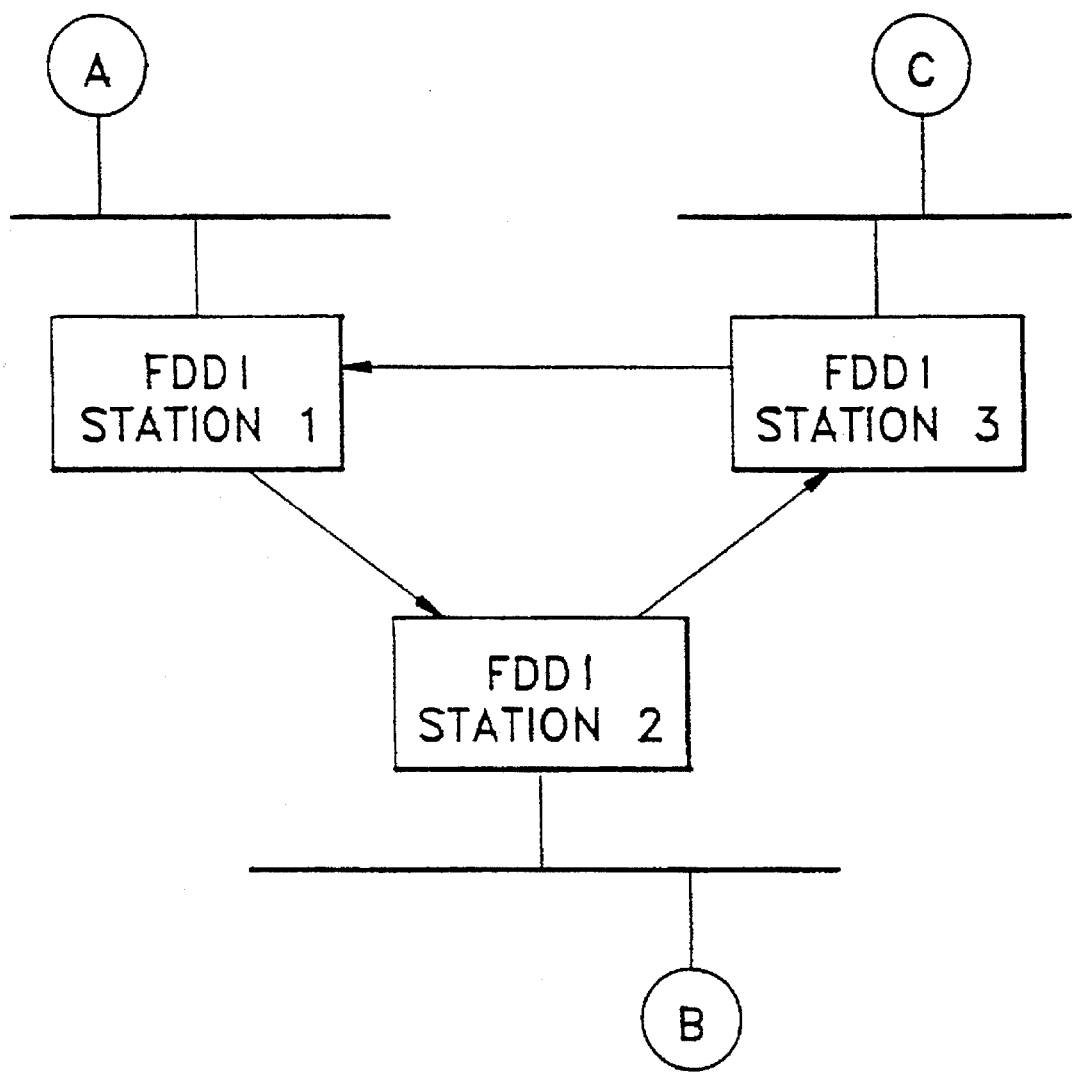
FIG. 1 is a diagram for illustrating the concept of a conventional FDDI network.
Figure 2:
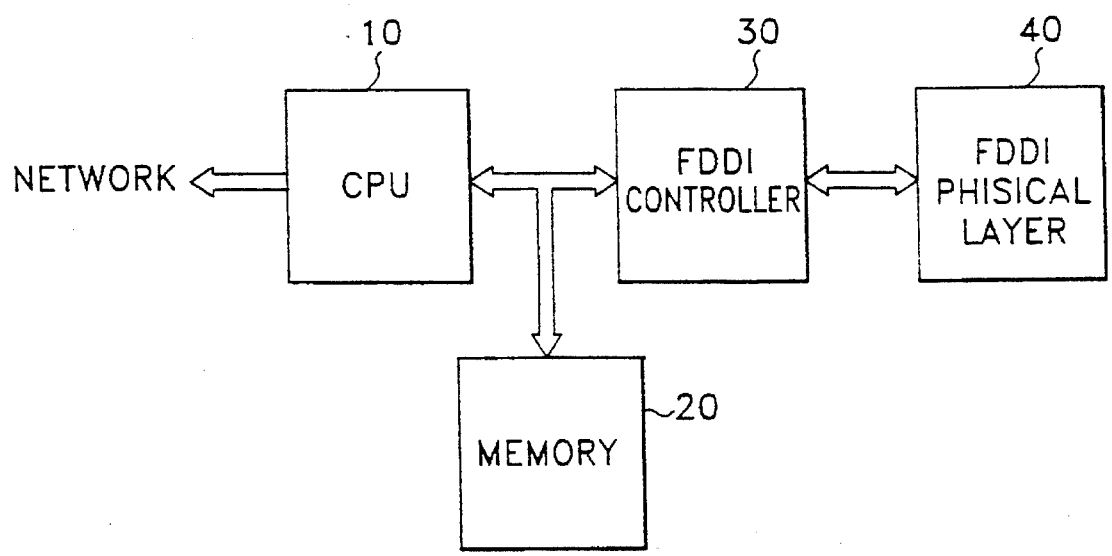
FIG. 2 is a block diagram of a conventional FDDI station.
Figure 3:
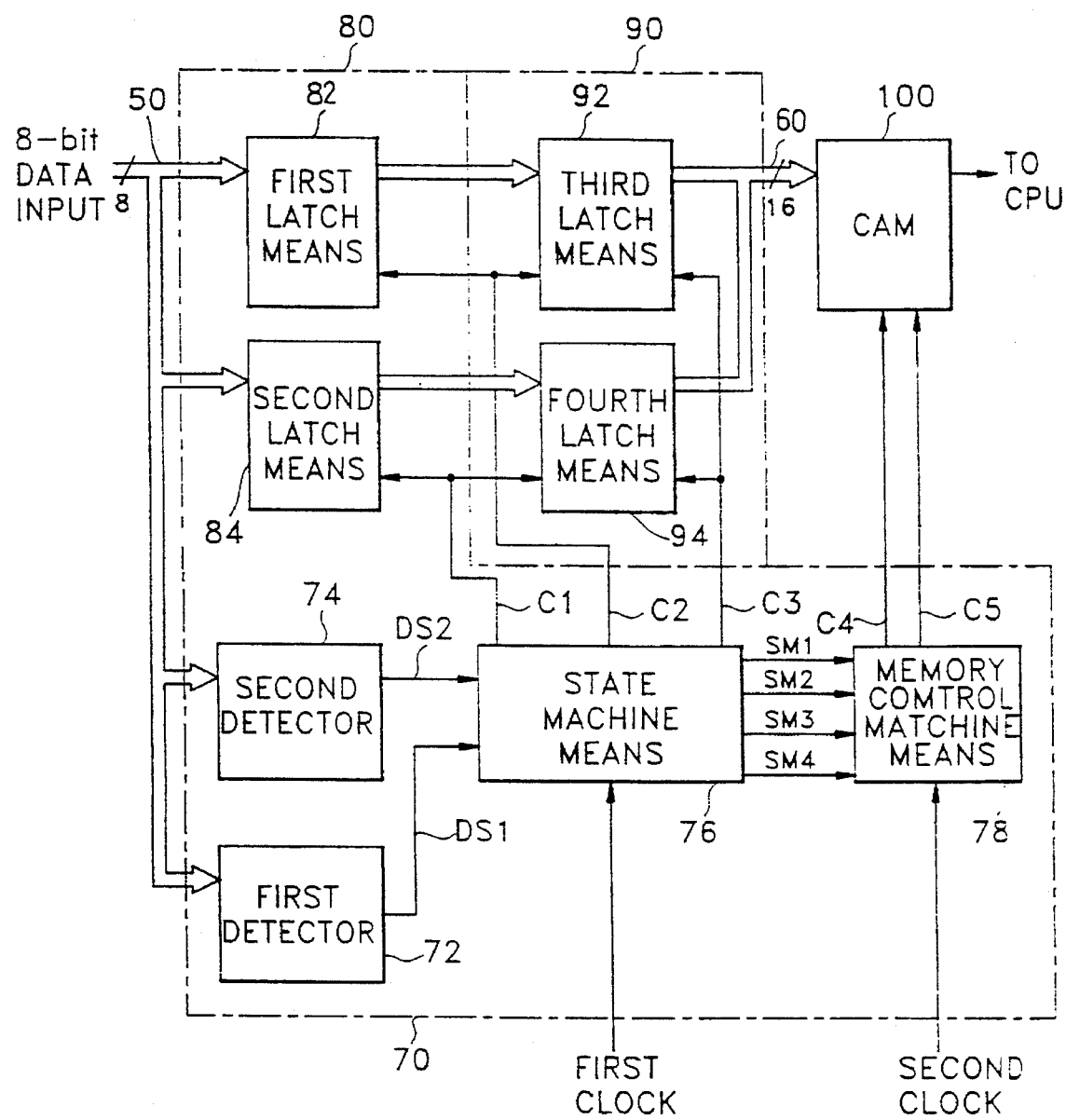
FIG. 3 is a block diagram of an address information reading-out apparatus of an FDDI station according to the present invention.

Referring to FIG. 3, the address information reading-out apparatus includes an 8-bit data bus 50, a 16-bit data bus 60, a control signal generating circuit 70, an input latch 80, an output latch 90 and a content-addressable memory (CAM) 100.

FIG. 4 is a diagram of the data format of a FDDI packet. Here, the packet format is a data format converted from serial bit-unit data into byte-unit data using an FDDI controller. In FIG. 4, JK is a symbol pattern indicating the start of the packet, FC is a frame controlling symbol, D1–D6 are destination addresses, S1–S6 are source addresses, the user's information is contained in the main data block of the packet, and FCS (frame check sequence) is an error checking signal.

Control signal generating means 70 comprises a first detector 72 for generating a first detection signal DS1 by detecting the start symbol JK of the 2-byte control symbols, a second detector 74 for generating a second detection signal DS2 by detecting frame control symbol FC of the 2-byte control symbols, a state machine 76 for generating an odd number latch control signal C1, an even number latch control signal C2, an output latch enable control signal C3 and state control signals SM1–SM4, which are synchronized with the first clock signal, in response to the first and second detection signals DS1 and DS2, and a memory control machine 78 for receiving the state machine control signals SM1–SM4, decoding the received signals and generating an enable control signal C4 and a write control signal C5, which are synchronized with the second clock signal. The input latch 80 comprises a first latch 82 connected to an m-bit data bus 50, for latching an odd number destination or source address symbols in response to the odd number latch control signal C1, and a second latch 84 connected to the m-bit data bus 50, for latching an even number destination or source address symbols in response to the even number latch control signal C2. The output latch 90 comprises a third latch 92 connected to the first latch 82 and enabled by the output latch enable control signal C3, for latching the output of the first latch 82 in response to odd number latch control signal C2, and a fourth latch 94 connected to the second latch 84 and enabled by the output latch enable control signal C3, for latching the output of the second latch 84 in response to even number latch control signal C1.

FIGS. 5A–5J constitute a timing diagram of the forwarding operation of the address information reading-out apparatus of FIG. 3. FIG. 5A is the first clock signal (12.5MHz), FIG. 5B is a received packet data stream to be supplied to 8-bit data bus 50, FIG. 5C is the first detection signal DS1 output from the first detector 72 for receiving start symbol JK, FIG. 5D is the second detection signal DS2 output from the second detector 74 for receiving frame control symbol FC, FIG. 5E is odd number latch control signal C1, FIG. 5F is even number latch control signal C2, FIG. 5G is output latch enable control signal C3, FIG. 5H is write control signal C5, FIG. 5I is enable control signal C4, and FIG. 5J is a 16-bit data stream received from 16-bit data bus 60 to be written in CAM 100.

Referring to FIGS. 3, 4 and 5A–5J, the operation of the present invention will be described below.

As shown in FIG. 5B, when the packet data is received from the FDDI network, the received data is input to the first detector 72 via 8-bit data bus 50. The first detector 72 detects start symbol JK, thereby indicating the beginning of the packet, generates the first detection signal DS1 (FIG. 5C) and applies it to state machine 76. Frame control symbol FC (1001 XXXX), being the next symbol of the packet data, is input to second detector 74. The second detector 74 interprets the symbol data, generates the second detection signal DS2 (FIG. 5D) and applies it to state machine 76.

State machine 76 determines that the packet data is being received from the FDDI network when the first and the second detection signals DS1 and DS2 in synchronization with the first clock signal are received. The state machine generates control signals C1, C2, C3 and SM1–SM4 for writing destination addresses D1–D6 into CAM 100 as 16-bit data, in order to perform the forwarding operation.

The destination address information is composed of six bytes and is written into CAM 100 three times in 16-bit units. First latch 82 latches destination address D1 at the rising edge 102 of odd number latch control signal C1 (FIG. 5E). Second latch 84 latches destination address D2 at the rising edge 104 of even number latch control signal C2 (FIG. 5F). As described above, input latch 80 alternately latches odd number address symbols D1, D3, D5 and even number address symbols D2, D4, D6 in the first and second latches in sequence. Output latch 90 is enabled by output latch enable control signal C3 (FIG. 5G) transitted in a 'low' state just after destination addresses D1 and D2 are latched in input latch 80. The third latch 92 latches destination address D1 output from the first latch, at the next rising edge 106 of odd number latch control signal C3, and the fourth latch 94 latches destination address D2 output from the second latch, at the next rising edge 108 of even number latch control signal C2. As described above, input latch 80 and output latch 90 alternately latch 8-bit symbols from 8-bit data bus 50 and output the latched symbols onto 16-bit data bus 60.

On the other hand, state control signals SM1–SM4 generated from state machine 76 are supplied to a memory control machine 78. Memory control machine 78 decodes state control signals SM1–SM4 and generates enable control signal C4 (FIG. 5I) and write control signal (FIG. 5H) which are synchronized with the second clock signal (25MHz) supplied from the system. Thus, after a pair of address symbols are latched in input latch 80, CAM 100 is enabled by enable control signal C4. Also, when a pair of address symbols is latched in output latch 90, the pair of address symbols is written in CAM 100 by write control signal C5.

When the destination address is completely written in CAM 100 by repeating the above operation three times, CAM 100 then generates a reading-out signal according to whether the address symbol matches the predetermined address information and provides the reading-out signal to the CPU of the system. According to the preferred embodiment, the determination of whether the address symbol matches the predetermined address information is accomplished by writing the destination address symbol. Thus, the address information decides whether the forwarding is performed, that is, the forwarding operation is performed when the address symbol and the predetermined address information match and the reading-out signal is to be generated. Likewise, when the address symbol and the predetermined address information do not match, the forwarding operation is not performed. On the other hand, if the determination of whether the address symbol matches the address information is accomplished by writing the source address symbol, the performance of the stripping operation is determined.

As described above, the apparatus of the present invention converts the packet data stream received from the FDDI network into a 16-bit data format, writes the data in a content-addressable memory and reads out the written data. As a result, the forwarding and stripping operations can be performed via hardware, and the excessive loading of the system's CPU, which is caused by processing the software, can be reduced, thereby enhancing the performance of the system while enabling compatibility with other network systems.

What is claimed is:

1. An apparatus for reading out address information of an FDDI network system for transmitting a packet having a plurality of m-bit symbols, comprising:

an m-bit data bus;

an n×m-bit data bus;

control signal generating means for detecting a start symbol and a control symbol among said plurality of m-bit symbols received via said m-bit data bus, and generating control signals;

input latch means for alternately latching odd-numbered and even-numbered address symbols among said plurality of m-bit symbols in response to the control signal of said control signals generating means;

output latch means for latching a pair of address symbols from said input latch means in response to the control signals of said control signal generating means, and outputting said latched pair of address symbols onto said n×m-bit data bus;

content addressable memory means for receiving said pair of address symbols from said n×m-bit data bus in response to the control signals of said control signal generating means, determining whether the input symbols match predetermined address information and, if so, generating a reading-out signal.

2. An apparatus for reading out address information as claimed in claim 1, wherein said control signal generating means comprises:

a first detector for generating a first detection signal by detecting the start symbol of said start and control symbols;

a second detector for generating a second detection signal by detecting the control symbol of said start and control symbols;

state machine means for generating an odd number latch control signal, an even number latch control signal, an output latch enable control signal and state control signals, which are synchronized with a first clock signal in response to said first and second detection signals; and memory control machine means for generating an enable control signal and a write control signal of said content addressable memory means, which are synchronized with a second clock signal in response to said state control signals.

3. An apparatus for reading out address information as claimed in claim 2, wherein said input latch means comprises:

first latch means connected to said m-bit data bus, for latching an odd number address symbol in response to said odd number latch control signal; and second latch means connected said m-bit data bus, for latching an even number address symbol in response to said even number latch control signal.

4. An apparatus for reading out address information as claimed in claim 3, wherein said output latch means comprises:

third latch means connected to said first latch means and enabled by said output latch enable control signal, for latching the output of said first latch means in response to said odd number latch control signal; and fourth latch means connected to said second latch means and enabled by said output latch enable control signal, for latching the output of said second latch means in response to said even number latch control signal.

5. An apparatus for use in reading out address information of an FDDI network system comprising:

a first data bus for transmitting a plurality of sequential symbols of a packet including a start symbol, and a plurality of alternating odd-numbered and even-numbered destination address symbols;

a first detector coupled to the first data bus for detecting the start symbol and outputting a first detection signal responsive to detecting the start symbol;

first and second latches coupled to the first data bus for sequentially latching a plurality of pairs of destination addresses responsive to the first detection signal, each pair of destination addresses including one of the odd-numbered destination address symbols and one of the even-numbered destination address symbols;

a second data bus coupled to both the first and second latches for simultaneously transmitting one of the pairs of destination addresses; and a content addressable memory having an input coupled to the second data bus for receiving the pairs of destination addresses and for generating a reading-out signal responsive to the plurality of alternating odd-numbered and even-numbered destination address symbols matching stored address information.

* * * * *